(12) United States Patent
Thambynayagam et al.

(10) Patent No.: US 6,829,570 B1
(45) Date of Patent: Dec. 7, 2004

(54) OILFIELD ANALYSIS SYSTEMS AND METHODS

(75) Inventors: Raj Kumar Michael Thambynayagam, Ridgefield, CT (US); Peter G. Tilke, Ridgefield, CT (US); Ian D. Bryant, Bethel, CT (US); Francois M. Auzerais, Paris (FR); Nicholas N. Bennett, North Haven, CT (US); Terizhandur S. Ramakrishnan, Bethel, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 742 days.

(21) Appl. No.: 09/712,491

(22) Filed: Nov. 14, 2000

Related U.S. Application Data

(60) Provisional application No. 60/166,541, filed on Nov. 18, 1999.

(51) Int. Cl.[7] .............................. G06G 7/48; G06G 7/50
(52) U.S. Cl. .............................. 703/10; 703/9; 707/10; 707/104.1; 715/513; 702/6; 702/14; 702/16
(58) Field of Search .................... 703/9, 10; 707/10, 707/104.1; 715/513; 702/6, 14, 16; 709/218, 203, 205, 219; 345/733, 738, 740, 748, 751, 756, 757, 760

(56) References Cited

U.S. PATENT DOCUMENTS 5,734,893 A   3/1998  Li et al. .................. 395/615
5,825,361 A * 10/1998  Rubin et al. .............. 345/839
6,498,988 B1 * 12/2002  Robert et al. .............. 702/6
6,519,568 B1 *  2/2003  Harvey et al. .............. 705/1
6,670,810 B2 * 12/2003  Duncan et al. .......... 324/244.1

* cited by examiner

Primary Examiner—W. Thomson
(74) Attorney, Agent, or Firm—David P. Gordon; William B. Batzer; John J. Ryberg

(57) ABSTRACT

An oilfield data analysis system is based on a four-tier software model which includes a "shared earth model" and a federation of "directory services". The first tier is a universal graphical user interface (GUI) which can operate on any inexpensive computer as well as on an expensive workstation, i.e. a "web browser". The second tier is an application server which is coupled to users via the world-wide web and serves geoscientific software applications. The third tier is a geometric modelling system where geometric data is stored and processed. The third tier embodies the "shared earth model". The fourth tier is a database management system where non-geometric data is stored. According to the invention, there can be (and preferably are) multiple instances of each tier. Communication of data between different tiers is accomplished via XML data exchange. According to a presently preferred embodiment, the geoscience applications served by the second tier are written as JAVA servlets and applications may communicate with each other without human direction by registering requests with "directory services". Applications interested in certain types of data "listen" for "data events" being registered with directory services. The cost of utilizing an application can be based on a time-rental billing operation which is carried out automatically via directory services.

18 Claims, 3 Drawing Sheets

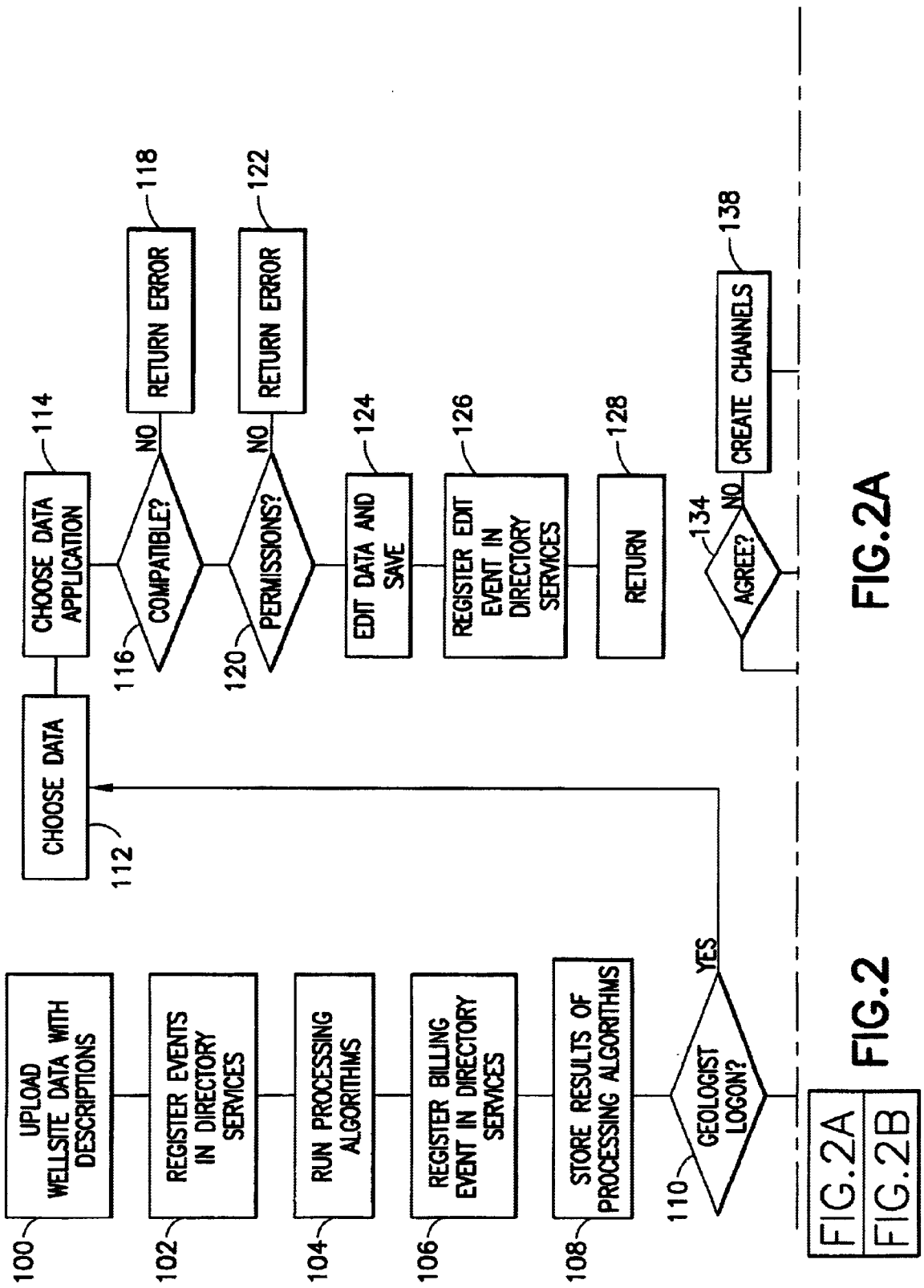

OILFIELD ANALYSIS SYSTEMS AND METHODS

This application claims the benefit of provisional application Ser. No. 60/166,541 filed Nov. 18, 1999.

BACKGROUND OF THE INVENTION

1. Field of the Invention

The invention relates to oil and gas exploration and production. More particularly, the invention relates to systems and methods for analysis of oil and gas exploration and production data.

2. State of the Art

Analysis of oil exploration and production data often requires complex geoscientific software. Most of the software is designed to analyze different types of data which are obtained through the use of different kinds of well logging and/or measurement tools. The types of data analyzed include pressure, temperature, conductance, resistivity, voltage, current, seismic data, etc. In general these data are analyzed using complex algorithms to produce a map or an image of the formation surrounding a well. The map/image is then analyzed using other complex algorithms in order to determine the geophysical properties of the formation, all for the purpose of locating and extracting hydrocarbons.

The vast majority of today's geoscientific software applications are designed to run on expensive Unix-based workstations. These workstations are affordable only to major oil companies, many of which have also paid high prices to have custom proprietary software written for their use alone. The market segment for independent and small producers is still largely ignored by major software/hardware vendors and these producers lack the resources to create custom proprietary software.

In addition, the vast majority of today's geoscientific software applications are unable to share data easily with other applications. The reality of modern oil exploration, however, demands that different professionals located in different parts of the world collaborate to analyze a remote oilfield. For example, an interpretation physicist may be located at an oilfield in, e.g. West Africa. However, the structural geologist who understands the complex faulting in this area might be located at a research center in Houston, Tex. The petrophysicist, who understands the rock types encountered in a recent well in the area, might be located in Aberdeen, Scotland. These three specialists represent part of the "Asset Team" for this project, each of whom needs to collaborate with the other in order to interpret the oilfield.

The number of steps involved in discovering, developing, and producing an oilfield (as used herein, "oilfield" includes oil and/or gas fields) is huge, and can involve hundreds of professionals working closely together for many years. Not only are these professionals typically distributed across the world (as discussed above), they are also distributed in tune. The seismic interpreter will pass the results of his work to the geologist, who will in turn pass his results to a reservoir engineer, and so on. At any point in this workflow, one of the professionals might have to revise his/her interpretation of the model of the oilfield. The distributed and iterative nature of this workflow across users, space, and time poses many challenges, particularly in view of the shortcomings of the software tools utilized by these professionals.

Geologists, geophysicists, geoscientists, petrophysicists, and reservoir engineers spend a significant portion of their time and effort managing the details of uploading and downloading data from various applications, translating data from one application to another, and keeping track of multiple models of an oilfield. The mechanics of using the software hinders the workflow. Moreover, the results from one application may not collaborate with a downstream application because the underlying modeling concepts may be completely different.

The Petrotechnical Open Software Corporation (POSC) was formed in 1990 to address some of these concerns. POSC is an international not-for-profit membership corporation which provides open specifications for information modeling, information management, and data and application integration. While this is a step in the right direction, many of the specifications utilize a "lowest common denominator" approach.

The oil and gas industry has a huge software investment in large and expensive systems from multiple vendors. The total cost of ownership (TCO) for these systems is very high. Many of these specialty applications (e.g. reservoir simulators) are used infrequently, but still have a very high TCO due to high licensing and support costs.

SUMMARY OF THE INVENTION

It is therefore an object of the invention to provide an oilfield data analysis system which overcomes the disadvantages of the systems presently utilized.

It is also an object of the invention to provide a geoscientific software system which facilitates workflow among multiple professionals accessing the same data from different locations and at different times.

It is another object of the invention to provide a geoscientific software system which facilitates the interchange of data among multiple applications.

It is a further object of the invention to provide a geoscientific software system which reduces the total cost of ownership of various applications and thereby makes the applications available to a broader market.

In accord with these objects which will be discussed in detail below, the oilfield data analysis system of the present invention includes software based on a four tier model which includes a "shared earth model" and a federation of "directory services". The first tier is a universal graphical user interface (GUI) which can operate on any inexpensive computer as well as on an expensive workstation, i.e. a "web browser". The GUI may be enhanced with JAVA applets which are embedded in web pages. The second tier is an application server (or servers) which is (are) coupled to users via the worldwide web and which serve(s) geoscientific software applications. The third tier is a geometric modelling system where geometric data is stored and processed. The third tier enables applications to access and interpret structural information about the earth's subsurface. The third tier embodies the "shared earth model". The fourth tier is a relational database management system where non-geometric data is stored. According to the invention, there can be (and preferably are) multiple instances of each tier. Communication of data between different tiers is accomplished via XML (Extensible Markup Language) data exchange. According to a presently preferred embodiment, the geoscience applications served by the second tier are written as JAVA servlets and applications can communicate with each other without human direction by registering requests with "directory services". Applications interested in certain types of data "listen" for "data events" being registered with directory services. Legacy applications (FORTRAN, C, C++, etc.) are supported via XML interfaces. The cost of utilizing an application can be based on a time-rental billing operation which is carried out automatically via directory services. Thus, a user can pay a relatively small fee for the limited time use of an application rather than the large cost of owning the application.

The oilfield analysis system operates as follows. Data from an oilfield is uploaded to the third tier. The data is automatically pre-processed to create the first version of the shared earth model. Professionals access a menu of applications via the worldwide web and choose a shared earth model to edit (embellish via further analysis). The system automatically determines which applications are compatible with the chosen model, determines whether the user has permission to edit this model, and determines whether the user has permission to use the application chosen. After the model has been altered, it is compared to any previous versions to determine consistency. If it is consistent with a previous version, it is saved, replacing the previous version. If it is not consistent, it is saved as an alternate interpretation. After it is saved, an edit event is registered in directory services. If the user has a time billing contract for the application, a billing event is also registered with directory services. Other interested applications/users have previously registered to listen for such events and they are automatically notified by directory services. This type of process proceeds from one professional to another using different applications and additional data, such as production data, with models becoming more and more developed. The system automatically determines compatibility of data, performs translations where necessary, and keeps track of the latest shared earth model(s). The users need not concern themselves with the housekeeping aspects of workflow. In addition, a broader range of applications is made available to users and the total cost of ownership of applications is minimized since it is not necessary to own an application to use it.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
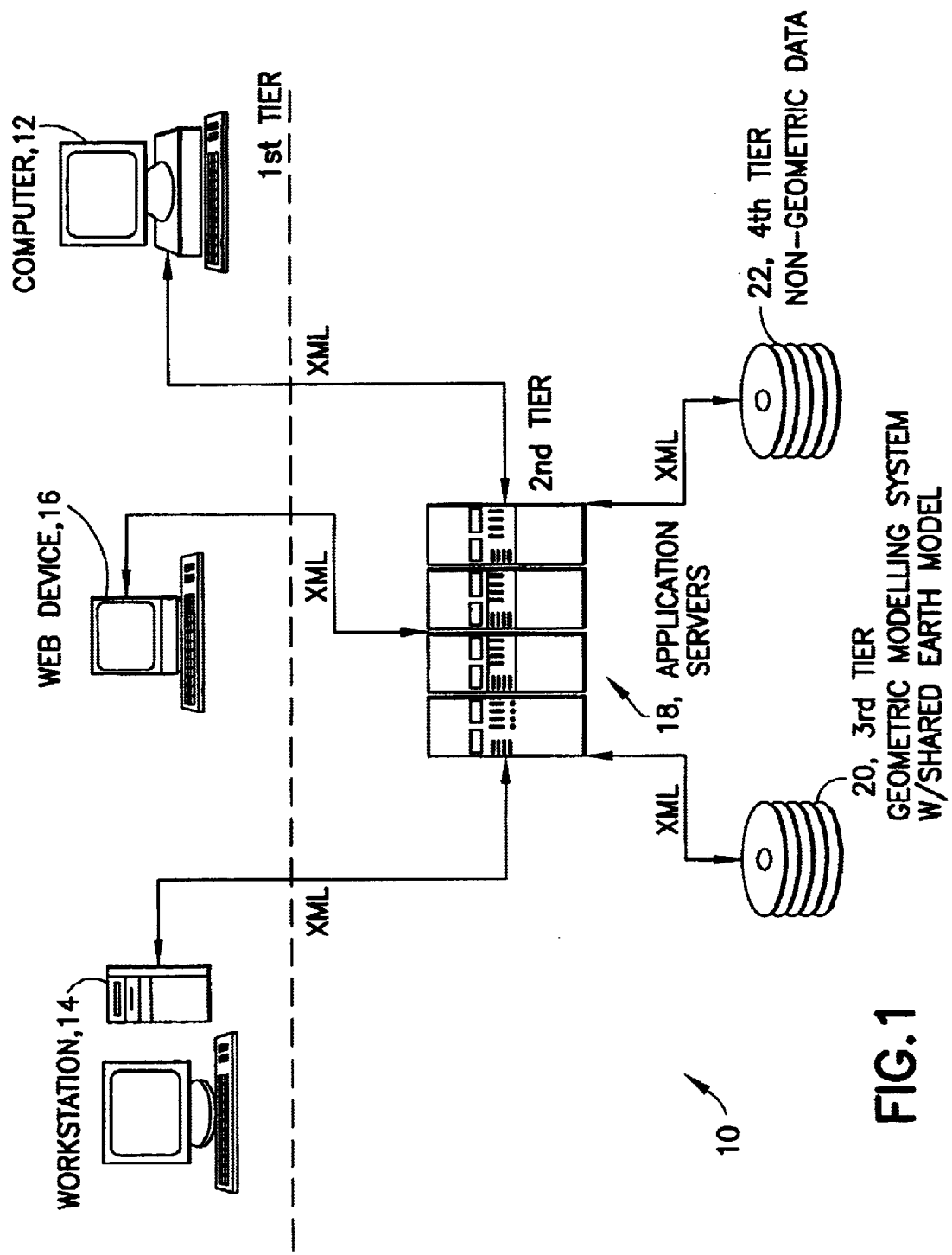
FIG. 1 is a simplified illustration of the overall structure of the system of the invention.

Referring now to FIG. 1, the oilfield data analysis system 10 of the present invention is based on a four-tier software model which includes a "shared earth model" and a federation of "directory services". The first tier is a universal graphical user interface (GUI) which can operate on any inexpensive computer 12 as well as on an expensive workstation 14, i.e. a "web browser". As such, the GUI can even be provided on an inexpensive "web device" 16 (e.g. a PDA). The GUI may be enhanced with JAVA applets which are embedded in web pages. The second tier is an application server 18 (or servers) which is (are) coupled to users via the worldwide web and which serve(s) geoscientific software applications. The third tier is a geometric modelling system 20 where geometric data is stored and processed. The third tier enables applications to access and interpret structural information about the earth's subsurface. The third tier embodies the "shared earth model". The fourth tier 22 is a relational (or object) database management system where non-geometric data is stored. According to the invention, there can be (and preferably are) multiple instances of each tier. Communication of data between different tiers is accomplished via XML data exchange. According to a presently preferred embodiment, the geoscience applications served by the second tier are written as JAVA servlets and applications communicate with each other without human direction by registering requests with "directory services". Applications interested in certain types of data "listen" for "data events" being registered with directory services. Legacy applications (FORTRAN, C, C++, etc.) are supported via XML interfaces. The cost of utilizing an application can be based on a time-rental billing operation which is carried out automatically via directory services. Thus, a user can pay a relatively small fee for the limited time use of an application rather than the large cost of owning the application.

The Extensible Markup Language, or XML for short, is a new technology for web-based applications. XML is a World Wide Web Consortium standard which can be found at http://www.w3.org /XML/Activity.html. Unlike HTML, XML permits the use of data identification tags. The invention takes advantage of XML so that exploration and production data can be transferred via the worldwide web. According to the invention, exploration and production data are represented as XML "business objects". A "business object" is an object that is managed according to "business rules". According to the invention, the underlying data model, and the relationships between the objects in the data model represent the "business rules". An example of well data represented in this manner is shown in the following code segment.

```
<?xml version="1.0" ?>
    <Well id="15">
        <UWI dt="string">400A1234567890</UWI>
        <Well_Name dt="string">A-5c/Well_Name>
        <True_Vertical_Depth dt="float">4567.89</True_Vertical_Depth>
        <Coord 1 dt="float"> 1234567.89 </Coord 1>
        <Coord1_Measurement dt="string">Length</Coord1_Measurement>
        <Coord1_Unit dt="string">m</Coord1_Unit>
        <Coord2 dt="float">987654.32</Coord2>
        <Coord2_Measurement dt="string">Length</Coord2_Measurement>
        <Coord2_Unit dt="string">m</Coord2_Unit>
        <Coord3 dt="float">76</Coord3>
```

```
        <Coord3_Measurement dt="string">Length</Coord3_Measurement>
        <Coord3_Unit dt="string">m</Coord3_Unit>
        ...
    </Well>
    <Well id="24">
        <UWI dt="string">400A1234567891</UWI>
        <Well_Name dt="string">C-4</Well_Name>
        <True_Vertical_Depth dt="float">4678.90</True_Vertical_Depth>
        <Coord1 dt="float">2345678.90</Coord1>
        <Coord1_Measurement dt="string">Length</Coord1_Measurement>
        <Coord1_Unit dt="string">m</Coord1_Unit>
        <Coord2 dt="float">876543.21</Coord2>
        <Coord2_Measurement dt="string">Length</Coord2_Measurement>
        <Coord2_Unit dt="string">m</Coord2_Unit>
        <Coord3 dt="float">67</Coord3>
        <Coord3_Measurement dt="string">Length</Coord3_Measurement>
        <Coord3_Unit dt="string">m</Coord3_Unit>
        ...
    </Well>
    <Well id="39">
        <UWI dt="string">400A1234567892</UWI>
        <Well_Name dt="string">F-3</Well_Name>
        <True_Vertical_Depth dt="float">4890.12</True_Vertical_Depth>
        <Coord1 dt="float">3456789.01</Coord1>
        <Coord1_Measurement dt="string">Length</Coord1_Measurement>
        <Coord1_Unit dt="string">m</Coord1_Unit>
        <Coord2 dt="float">765432.10</Coord2>
        <Coord2_Measurement dt="string">Length</Coord2_Measurement>
        <Coord2_Unit dt="string">m</Coord2_Unit>
        <Coord3 dt="float">45</Coord3>
        <Coord3_Measurement dt="string">Length</Coord3_Measurement>
        <Coord3_Unit dt="string">m</Coord3_Unit>
        ...
    </Well>
</Well_Collection>
```

The above example is a list of three wells with basic header information such as Unique Well Identifier (UWI), well name (Well_Name), true vertical depth of the well (True_Vertical_Depth), and the surface location information: Coord1 (easting), Coord2 (northing), and Coord3 (Kelley Bushing elevation). Note that some additional information defining the measurement domain of the surface locations (Length), and the units of the positions (m for meters) is also included to give an example of the types of information that define a well. The list of attributes shown above is a subset of those belonging to a well, as indicated by the ellipses ( . . . ).

Because of the text-based nature of XML, not all exploration and production data can be represented by XML. For example image and seismic data are not easily represented by XML. "Meta-data" for these data can however be represented by XML. The following code segment illustrates how "meta-data" of a core image is represented as an XML business object.

```
<Core_image id="1234">
    <Core_id dt="int">5678</Core_Id>
    <Light_Type dt="string">White Light</Light_Type>
    <Scan_Type dt="string">Whole Core</Scan_Type>
    <Filename dt="string">1234.jpg</Filename>
    <Code dt="string">Main</Code>
    <Top_Depth dt="float">2345.67</Top_Depth>
    <Bottom_Depth dt="float">~2347.82</Bottom_Depth>
    <Core_Number dt="int">1</Core_Number>
    <Well_id dt="int">2c</Well_Id>
</Core_image>
```

The core image itself is not actually represented by XML, but is represented by referencing a binary (JPEG) file ("1234.jpg") using the 'Filename' attribute. The XML object may thus also represent bulk data (as compared to meta-data) by a reference to a binary data representation in a file.

In general, according to the presently preferred embodiment of the invention, image data, e.g. core photos and formation microscanner images (FMI), are represented by reference to JPEG files. JPEG files can be displayed by any web browser and can be delivered to any other application with JPEG parsing capabilities.

Like the well object, this Core_Image business object has a unique id (1234). This Core_Image object references another business object via the Core_Id attribute. The Core_Id attribute thus captures the relationship that this Core_Image object is an image of the core whose id is 5678. The referenced core object (not shown) will contain other information about the core.

At According to the presently preferred embodiment of the invention, SQL queries are delivered via XML. In particular, queries or requests for data are delivered between tiers using an XML representation of the query. For example, a query from the first tier to the second tier for all of the well business objects from the 'A' oil platform (i.e., al wells having a name beginning with 'A-'), can be represented by the following the syntax:

```
<?xml version="1.0" ?>
<SQL>
    <Type>Well</Type>
    <Where>Well_Name LIKE 'A-%'</Where>
    <Order_By>Well_Name</Order_By>
</sQL>
```

The query stated above is generated when the user of a browser based map application in the first tier identifies a number of offshore oil platforms on the map and decides that (s)he is interested in all the wells from the 'A' platform. Graphically, the query is constructed by moving the mouse pointer to the 'A' platform on the map and clicking once. The query is delivered to the second tier using the SQL XML packet shown above. The second tier recognizes that this is not a geometric query and forwards it on to the fourth tier rather than the geometric engine of the third tier. The fourth tier parses the SQL XML packet to execute the query and returns the query results to the second tier as a collection of XML well business objects. The second tier then forwards these results back to the first tier.

As with the image data described, single channel well log data (e.g. gamma ray data) are too large to be represented as text within an XML business object. According to the presently preferred embodiment of the invention, well log data of this type are represented using a binary encoding scheme (e.g. Base64). The code fragment below illustrates how gamma ray data may be represented.

```
<Array id="1234">
    <Borehole Id dt="int">5678</Borehole_id>
    <Axis_Index_Id dt="int">9012</Axis_Index Id>
    <Code dt="string">GR</Code>
    <Value_Type dt="string">Float32</Value_Type>
    <Value dt="binary">B9ILEB . . . APF82BL</Value>
</Array>
```

In the above example, as part of constructing the XML object, the well log data, represented as an array of floats, is encoded into the Base64 ASCII representation which is abbreviated in the above example as B9ILEB . . . APF82BL. It will be appreciated that the Base64 ASCI text will actually comprise many thousands of bytes. When a client or another server receives the XML array object, it then parses the Base64 string back into the float array. This binary encoding of exploration and production array data using schemes such as Base64 is used when the binary data must be embedded in the XML packet. Otherwise, the filename pointer approach described above with respect to images is used. Conversely, image data, as well as many other types of non-text data may be embedded in an XML object using binary encoding. Both of these methods can be used for a wide variety of data including well logs, core image data, multidimensional array data, FMI (formation micro imager) images, and seismic data.

Well logs, image data, and multidimensional array data are currently delivered from applications as proprietary binary 1D, 2D, or 3D arrays. According to an alternative preferred embodiment of the invention these data types are encoded in MPEG-7 or MPEG-21 format. MIPEG-7 and MPEG-21 are rapidly evolving content representation standards for multimedia information search, filtering, management and processing (http://www.cselt.it/mnpeg). MPEG-7 is scheduled for approval as a standard in July 2001. In addition to replacing JPEG as a standard for exchanging well log, image, and multidimensional meta-data, MPEG-7 can be used to exchange exploration and production bulk data. Moreover, in addition to being a standard, MPEG-7 presents an opportunity to add significantly to the information content in these data. Meta-data representations of the bulk data can also be encoded into the MPEG-7 representation. This permits sophisticated searching and filtering to be applied. For example, "Progressive content-based retrieval of image and video with adaptive and iterative refinement" (U.S. Pat. No. 5,734,893) dissects a 2D image into feature vectors. These feature vectors then allow queries of the form "Find all the shale in this image" to be made. Currently, these feature vectors are managed separately from the images themselves. With MPEG-7, the feature vectors can be incorporated with the raw image data itself into a single file.

According to the presently preferred embodiment, the data structures described above and all other exploration and production data are stored in databases. Data is exchanged using the recently embraced XML Database Schema Specification. See, generally, http://www.w3.org/TR/xmlschema-1 and http://www.w3.org/TR/xmlschema-2. Traditionally, Document Type Definitions (DTDs) have been used to define XML schemas. The XML Database Schema Specification has significant advantages over DTDs; the principal advantages being simplicity, and inheritance support. The inheritance support function is important for supporting the business object architecture used by the invention. With inheritance support, a new object can be defined by referencing a base class object definition. An example of part of an exploration and production database schema is illustrated by the code section below which represents well data.

```
<Element Type name="Coord1" content="textOnly" model="closed"> <datatype
dt:type="float" /> </ElementType>
<ElementType name="Coord1_Measurement" content="textOnly" model="closed">
<datatype dt:type="string" /> </ElementType>
<ElementType name="Coord1_Unit" content="textOnly" model="closed"> <datatype
dt:type="string" /> </ElementType>
<ElementType name="Coord2" content="textOnly"model="closed"> <datatype
dt:type="float" /> </ElementType>
<ElementType name="Coord2_Measurement" content="textOnly" model="closed">
<datatype dt:type="string" />
</ElementType>
<ElementType name="Coord2_Unit" content="textOnly" model="closed">
<datatype dt:type="string" />
</ElementType>
<ElementType name="Coord3" content="textOnly" model="closed">
<datatype dt:type="float" />
</ElementType>
<ElementType name="Coord3_Measurement" content="textOnly" model="closed">
<datatype dt:type="string" />
</ElementType>
<ElementType name="Coord3_Unit" content="textOnly" model="closed">
<datatype dt:type="string" />
```

-continued

```
</ElementType>
<AttributeType name:="Id" dt:type="id" />
<ElementType name="True_Vertical_Depth" content="textOnly" model="closed">
<datatype dt:type="float" />
</ElementType>
<ElementType name="UWI" content="textOnly" model="closed">
<datatype dt:type="string" />
</ElementType>
<ElementType name="Well_Name" content="textOnly" model="closed">
<datatype dt:type="string" />
</ElementType>
<ElementType name="Well_View" content="eltOnly" model="closed" order="many">
<attribute type="Id" />
<element type="UWI" />
<element type="Well Name" />
<element type="True_Vertical_Depth" />
<element type="Coord1" />
<element type="Coord1_Measurement" />
<element type="Coord1_Unlt" />
<element type="CoordZ" />
<element type="Coord2_Measurement" />
<element type="Coord2_Unlt" />
<element type="Coord3" />
<element type="Coord3_Measurement" />
<element type="Coord3_Unit" />
</ElementType>
```

The schema definition above first defines the data types for the properties of the well object, and then it defines the well object itself. The entire schema for all objects in the database is defined in this manner, and available to the application parsing the data. In the well example, the schema is available as the "schema.xml" namespace reference.

As mentioned above, exploration and production data is typically stored in relational databases. These databases, which constitute the fourth tier of the four tier model, may or may not have object oriented interfaces. Used unwisely, delivery of XML from a database can severely impact performance of the database. According to the invention, XML is preferably generated natively in the database engine, rather than the database results being delivered via traditional data exchange protocols such as ODBC (Open Database Connectivity) or JDBC (Java Database Connectivity) to another application for conversion to XML. In the case of relational database interfaces, SQL Views are defined to return the XML stream to the calling application. An example is illustrated below with the SQL Statement for the well object.

```
SELECT
'<Well id = "' + CONVERT(varchar, Well.ld) + '">' +
'<UWI>' + ISNULL(Well.UWI, '') + '</UWI>' +
'<Well_Name>' + ISNULL(Well.Well_Name, '') + '</Well_Name>' +
'<True_Vertical_Depth~' + ISNULL(CONVERT(varchar,
ROUND(Well.True_Vertical_Depth, 2)), '') + '</True_Vertical_Depth~' +
'<Coord1>' + ISNULL(STR(ROUND(Position.Coord1, 2), 12, 2), '') + '</Coord1>' +
'<Coord1_Measurement>' + ISNULL(Position.Coord1_Measurement,'') +
'</Coord1_Measurement>' +
'<Coord1_Unit>' + ISNULL(Position.Coord1_Unit,'') + '</Coord1_Unit>' +
'<Coord2>' + ISNULL(STR(ROUND(Position.Coord2, 2), 12, 2), '') + '</Coord2>' +
'<Coord2_Measurement>' + ISNULL(Position.Coord2_Measurement,'') +
'</Coord2_Measurement>' +
'<Coord2_Unit>' +ISNULL(Position.Coord2_Unit,'') +'</Coord2_Unit>' +
'<Coord3>' + ISNULL(CONVERT(varchar,ROUND(Position.Coord3, 2)), '') +
'</Coord3>' +
'<Coord3_Measurement>' + ISNULL(Position.Coord3_Measurement,'') +
'</Coord3_Measurement>' +
'<Coord3_Unit>' + ISNULL(Position.Coord3_Unit,'') + '</Coord3_Unit>' +
'</Well>' AS Xml
FROM Well
LEFT OUTER JOIN Position ON Well.Surface_Location_ld = Position.ld
```

According to the invention, the database server programmatically generates query definitions of this nature. In this architecture, the databases become XML data channels capable of delivering streams of oilfield data across the internet.

The invention also provides an interface between different exploration and production data models. The interface is provided with the use of Extensible Style Sheets (XSL-http://www.w3.org/Style/XSL). XSL has two parts: (a) a language for transforming XML data (http://www.w3.org/TR/WD-xslt), and (b) an XML vocabulary for specifying formatting semantics. As a language for transforming XML data, XSL is used for translation between different exploration and production data models. For example, it is expected that in the next few years, numerous exploration and production data sources will be made available in the CORBA (common object request broker architecture) based Open-Spirit format (http://www.openspirit.org/). By providing an XML interface in the second tier to OpenSpirit, a web-based client in the first tier is able to access these databases via XML. Furthermore, applications with interfaces that are non-compliant with OpenSpirit are able to communicate with these data sources by transforming the data with XSL.

As mentioned above, according to the invention, exploration and production data can be displayed as web pages within a web browser in the first tier. The functionality of modern web browsers is sufficient to allow delivery of the data to the web browser as XML, and rendered using HTML, Dynamic HTML (DHTML), JavaScript, etc. Thus, users interacting with exploration and production data have access to these data without having to install large and complex software packages. In the second tier, the web pages are dynamically generated. For example, a database query is executed on a fourth tier server. The result of the query in XML is then delivered to the second tier server. The second tier server dynamically generates a web page for delivery of the XML to the browser in the first tier.

As mentioned above, the invention employs a distributed application and database architecture where the shared earth model preferably constitutes the principal database interface to all the distributed applications. Also as mentioned above, communication among applications, users, and devices is preferably effected via directory services such as those found in Windows 2000's Active Directory (http://www.microsoft.com) and JINI (http://developer.java.sun.com/developer/products/jini/).

According to the invention, exploration and production databases and applications are distributed throughout the world. A user does not need to locally install a project database, or even know the location of a remote database. Instead, the user accesses a web page via a URL (uniform resource locator) address and enters requests via the interface provided by the web page. For example, when a user enters a request for information about a well from a certain geographic location, directory services forwards the request to all the databases registered with directory services, and the well data is returned to the user.

Figure 2B:
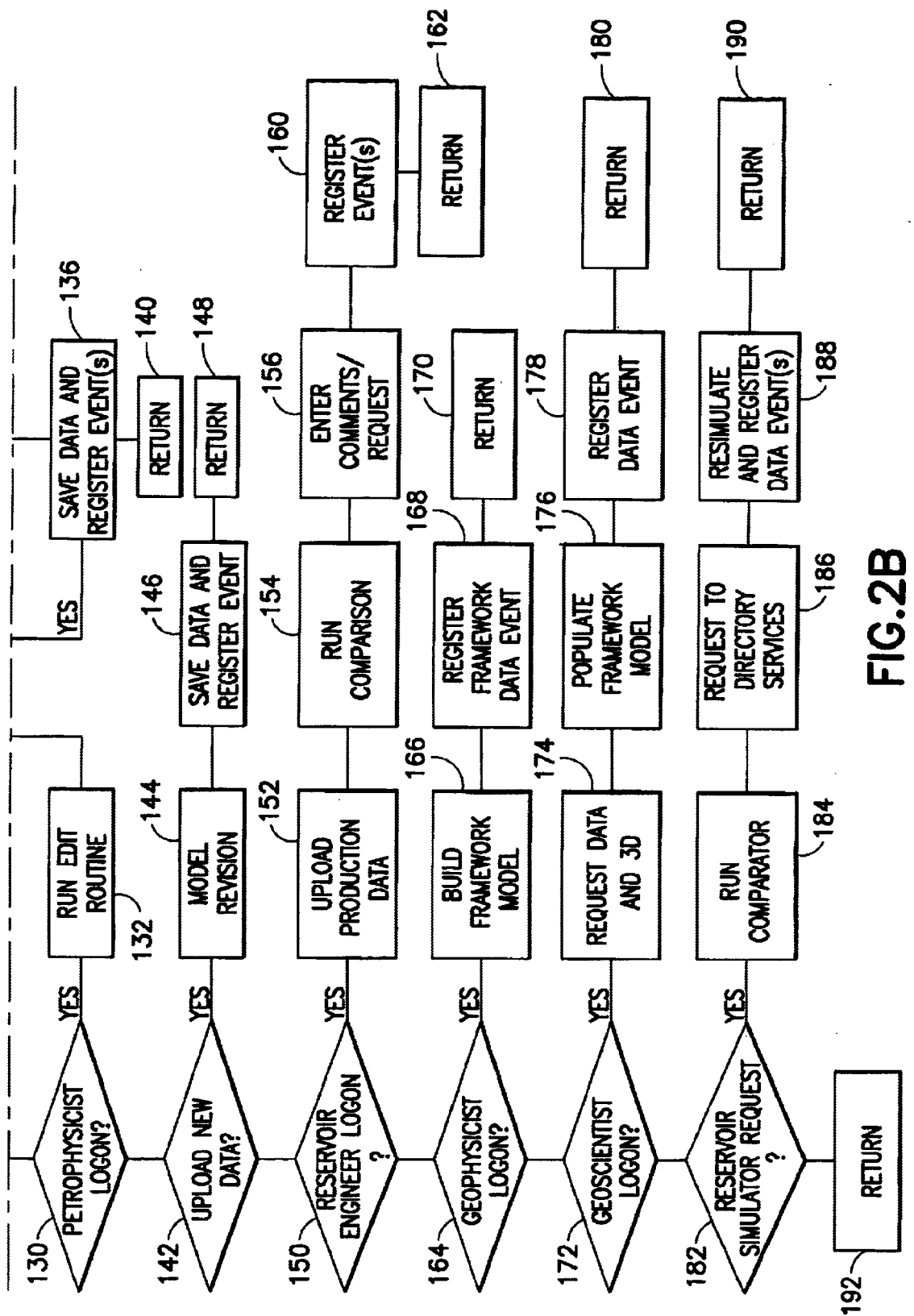
FIG. 2 is a simplified flow chart illustrating an example of how the system of the invention operates.

Turning now to FIG. 2, a simplified example of typical operation of the software system is illustrated as a flow chart. The software system operates as follows. Prior to uploading wellsite data at 100, all of the acquisition data regarding borehole acquisition are stored along with the mode of acquisition, the type of data (1D or 2D). The mode and the relevant pointers may be kept in borehole_data_items_recording. These are the data acquired at the wellsite by either a wireline or LWD engineer. Information regarding the applications that are used to record and process the well data are uploaded at 100 to a database at a central data manager location. During this process, at 102 events are registered with the directory services called "log_data_items_recording", which includes acquired data type, the location (which well, depth in the well, the well trajectory), and other necessary header information for identification purposes. Further details regarding the specifics, including details of the header information (e.g., mud details, logging environment, acquisition system) are also stored within the database.

According to the presently preferred embodiment, the oil company that contracted the oilfield service has a standing contract for use of automatic processing algorithms at 104 running on specified servers. These processing services continually monitor the network for data_items_recording (seismics and logs) events that are tagged with a digital signature of the contracting oil company. The processing service performs the routine verification tasks such as consistency among data channels. Using translators, if necessary, data will be manipulated to a standard format that obeys necessary industry compliance standards (POSC, for example). The processing time expended is recorded and posted back to the Directory Services as a processing_time_expended event at 106. The oilfield services company and the oil company's billing applications listen for and receive the billing event. The results of the processing performed at 104 are stored at 108 in a database, e.g. "log_data_items_acquired".

As shown in FIG. 2, the software provides several different types of functions which are initiated by different kinds of users. For example, a geologist logs onto the system at 110 and preferably verifies his identity with a smart card. The geologist chooses data with which to work at 112. The system automatically posts to the directory services an event called edit_project_data. The edit_project_data event includes information such as the data formats for input and output other than the standard recommended forms, the owner(s) of the data, the identity of the geologist (smart card tag number) etc. Several services (applications) listening for the event signal their availability at 114 where the geologist selects an application By from the list. Either prior to presenting the list at 114 or after the geologist makes a selection, it is determined, e.g. at 116 if the application and the data are compatible. If not, the system returns an error at 118. If they are, it is determined, e.g. at 120 whether the geologist is authorized to use the selected application. If not, the system returns an error at 122. If the geologist is authorized, he will be given the tools to edit and save his work at 124. Saving changes made in the well data triggers at 126 the recording of an event with the directory services called well_geology_data_edited that describes the location of the changed data, the owner of the changes, the time of the changes, and the location of the backup data. The system returns to main menu at 128 and the geologist logs off.

Other users and applications that are listening for the well_geology_data_edited event change are automatically alerted. Users who are members of the Asset Team who are logged onto the system or who log on subsequently to the system receive a message that a well_geology_data_edited event has occurred. For example, a petrophysicist running a log analysis application will retrieve the data from directory services in a manner similar to that described above. At 130 the petrophysicist logs on and an edit_well_petrophysical event is launched. The petrophysicist makes the necessary corrections (environmental, depth offsets, core calibration points etc.) to the data at 132. The logs are then converted to reservoir engineering parameters that may include porosity, saturations, clay content, lithofacies, permeabilities and other relevant two and three phase flow descriptions. At 134, the system determines whether the edited data agrees with previous versions. If it does, the data is saved and an event called well_petrophysical_data_edited is posted in directory services at 136. If it disagrees with earlier data, a channel is created at 138 for each point of disagreement and separate copies of the data are saved at 136.

The petrophysicist and the geologist see the well_geology_data_edited and well_petrophysical_data_edited events. They can then compare and contrast their channels of results. The geologist, for example, may disagree with the lithology output of the petrophysicist and may initiate a compromise event signal. If no agreement is reached, two different channels of results for lithology remain. Thus the number of reservoir models propagated will be influenced by the number of disagreements that exist among the respective domain experts. The event recorders however keep track of such issues and propagate the models accordingly. A confidence value may be assigned to organize priority among the models.

Another geologist may be working with outcrop data. With suitable authorization, he can view both the geological and petrophysical well data recorded in the database and the history of the editing as described above with respect to the first geologist and the petrophysicist. The second geologist can call an online archive and query for outcrop data with a similar depositional environment. She can examine rock types and their associated statistical permeabilities and hydrocarbon saturations. as shown in FIG. 2 at 142, she can upload these statistics and request a model revision at 144. Saving the revision at 146 triggers the registration of a well_geology_data_2 edited event in the directory services, which records the owner of the event and time of the registration. Again the revision may be confirmed by the first geologist in which case the database is revised to make the well_geology_data_2_edited to be the model with a higher degree of confidence. Otherwise, separate channels may be created.

At 150 in FIG. 2, a reservoir engineer working with production data, e.g. pressure, production rates, and watercuts, which incidentally may be automatically recorded into the database, logs on and may request to view the data described above. If the data was not automatically uploaded, it is uploaded at 152. The reservoir engineer can compare the production data (s)he is observing to the static sedimentological model of reservoir elements suggested by the petrophysicist and the geologists at 154. (S)he can record comments at 156 which are registered in the directory services and made available to these collaborators at 160. A request to revise the static model may also be published to the system and a consensus developed and revised confidence levels ascribed to the new model of reservoir elements. The contributions of the above interactions produce a dynamic sedimentological model of reservoir elements. When the reservoir engineer is done, the system returns at 162.

A geophysicist in a remote location can review the data processing. After logging on to the system at 164 and selecting "build framework model" at 166, an event called reservoir_build_framework is posted to directory services. This event carries information as to which services and data are required to fulfil the request (seismic, 3D reservoir model applications etc.). Various applications and data sources are listening for this event and respond with their services. The directory services, using the contents of the reservoir_build_framework event sorts out which groups of applications can be used together to carry out this workflow item for the data and presents them to the user. The geophysicist can select from groups of applications that can be used together or place an order for an application not included in this list. The geophysicist reviews the results of previous interpretations (through well_global_data_view), and further interprets the data (S)he may, in collaboration with the reservoir engineer, produce a framework model of the reservoir. They record the framework at 168 which triggers a reservoir_framework_data event to be registered with the Directory Services. At the end of this procedure the asset team has constructed a structurally constrained 3D model of reservoir elements that may contain several wells.

As mentioned above, if the seismic simulator that the geophysicist would like to use is not available, then the geophysicist can post a seismic_processor_request event to the directory services. The vendor of this simulator receives this request and returns to the geophysicist a confirming order specifying the vendor's options for fulfilling this request. The geophysicist may decide not to have the seismic data shipped to the vendor's simulator facility, but for the vendor to install its simulator in a specified server. Upon fulfilling the request some hours or days later, the vendor notifies the geophysicist.

A geoscientist wanting to produce a populated 3D model of reservoir elements for use with a simulator may log on at 172 and request additional well data as well as his/her 3D property model at 174 to populate a framework model at 176. When the request is made at 174, requests may be sent to all of the wells' global data along with requests for applications to convert this information into populating the framework model with properties. Depending on licensing arrangements and data formatting issues similar to those outlined before, the geoscientist can record the final outcome into the database, thus generating at 178 a reservoir_property_data event which the other team members listen to and comment on later.

As shown in FIG. 2, a reservoir simulator request with all of the property data and the well geometries and completion data is made at 182. The reservoir simulation application is registered with the Directory Services. So is a comparator application residing as a driver. Upon invoking the comparator application at 184 and being configured with the request to validate, e.g., a reservoir model against time-lapse seismic data, the comparator makes a request at 186 to the directory services for: a reservoir simulator, a seismic modeling package, and all of the framework and property modeling data containing all of the information regarding the reservoir elements. Registering in the directory services the corresponding events again carries out this request. Responses from the applications that listen for these events are relayed to the user who makes selections manually or automatically (e.g., with an optimizer) or via prerecorded user preferences. While using the comparator application, if the user shifts the position of an horizon in the Geometry model, then an event is cast to the directory services called geometry_model_changed which describes the content of the changes. The reservoir simulator responds to this event, by making its user interface available to the user and making available its services to re-simulate the reservoir and update production estimates. The user can re-simulate and update the production profile of the reservoir at 188, the process continuing in a number of different pathways that may include an edit for the framework and/or the properties. Every edit event is recorded and, if necessary, the events are notified to all of the asset team members. The cycle may be repeated in part or in whole as many times the asset team members ordain the process to be repeated until the program returns at 190.

Each of the above described procedures may be repeated from the system return at 192 through any of the processes described. The techniques described may be used individually or jointly to create an Internet based geoscientific software system that allow geoscientific software applications to utilize the worldwide web more effectively. There have been described and illustrated herein several embodiments of an oilfield analysis system. While particular embodiments of the invention have been described, it is not intended that the invention be limited thereto, as it is intended that the invention be as broad in scope as the art will allow and that the specification be read likewise. It will therefore be appreciated by those skilled in the art that modifications could be made to the provided invention without deviating from its spirit and scope as so claimed.

What is claimed is:

1. A system for analysis of oil/gas exploration and/or production data, comprising:
   a) a communication network;
   b) a geometric modeling system storing a shared earth model, said geometric modeling system being coupled to said network;
   c) a plurality of directory services coupled to said network;
   d) an application server coupled to said network; and
   e) a database management system coupled to said network, wherein
      changes made to said shared earth model by users in non-real-time are published over said network via said directory services.

2. A system according to claim 1, further comprising:
   f) a graphical user interface coupled to said network, wherein
      said graphical user interface communicates with said shared earth model and said database management system via said application server.

3. A system according to claim 2, wherein:
   said application server serves applications to said graphical user interface.

4. A system according to claim 3, wherein:
   said application server delivers data to said graphical user interface via an XML data stream.

5. A system according to claim 3, wherein:
   said application server delivers data to said graphical user interface via a pointer embedded in an XML data stream, said pointer pointing to a binary file.

6. A system according to claim 3, wherein:
   said application server delivers data to said graphical user interface via binary encoded ASCII embedded in an XML data stream.

7. A system according to claim 3, wherein:
   said application server receives data from said geometric modeling system and said database via an XML data stream.

8. A system according to claim 3, wherein:
   a selection of data from said geometric modeling system or said database by a user via said application server causes said application server to automatically present the user with a list of compatible applications.

9. A system according to claim 3, wherein:
   a selection of data from said geometric modeling system or said database by a user via said application server causes said application server to automatically locate a suitable translator program for the data.

10. A system according to claim 3, wherein:
    an execution of an application via said application server by a user which execution causes a modification of data retrieved from said geometric modeling system or said database via said application server causes said application server to automatically compare the modified data with the previous version of the data to determine whether the versions are consistent.

11. A system according to claim 10, wherein:
    when said application server determines inconsistent versions of data, different versions are saved in different data channels.

12. A system according to claim 1, wherein:
    said application server automatically runs an application when a change in the shared earth model is published.

13. A system according to claim 1, wherein:
    said application server automatically publishes a billing event to said directory services when an application is used.

14. A method of analyzing oilfield exploration and/or production data, comprising:
    a) storing a shared earth model on a geometric modeling system coupled to a communication network;
    b) storing a plurality of data analysis programs on an application server coupled to the network;
    c) providing a plurality of directory services coupled to the network;
    d) storing non-geometric oilfield data on a database management system coupled to the network;
    e) permitting authorized users to access the shared earth model and/or the non-geometric data via the network;
    f) permitting authorized users to edit the shared earth model using an application from the application server; and
    g) automatically publishing the fact that the shared earth model was edited over the network via the directory services.

15. A method according to claim 14, further comprising:
    h) automatically comparing an edited version of the shared earth model with a previous version; and
    i) replacing the previous version with the edited version only if the edited version is consistent with the previous version.

16. A method according to claim 15, further comprising:
    j) saving both the previous version and the edited version if they are not consistent.

17. A method according to claim 14, further comprising:
    h) automatically uploading oilfield data to the database management system.

18. A method according to claim 14, further comprising:
    i) automatically constructing a first version of the shared earth model from oilfield data stored in the database system.

* * * * *